United States Patent Office 3,145,219
Patented Aug. 18, 1964

3,145,219
Δ⁹,¹⁰-OCTALINS
Harry Norman Cripps, Hockessin, Del., assignor to E. I. du Pont de Nemours and Company, Wilmington, Del., a corporation of Delaware
No Drawing. Filed Sept. 30, 1959, Ser. No. 843,360
6 Claims. (Cl. 260—346.3)

This invention relates to cyclic organic compounds. More particularly, it relates to new unsaturated cyclic organic compounds having certain functional groups, and to a method for their preparation.

This is a continuation-in-part of U.S. applications Serial No. 476,585, filed December 20, 1954, by H. N. Cripps, and now abandoned, and Serial No. 532,376, filed September 2, 1955, by H. N. Cripps, now U.S. Patent No. 2,914,541.

Unsaturated compounds have certain properties which make them useful in various applications. One such property which is responsible for their widespread commercial use is the ability of many unsaturated compounds to be polymerized to valuable high molecular weight products. While the known polymers have many characteristics which are desirable for use in various applications, there are some applications in which polymers having certain specific properties or combinations of properties would have increased utility.

This invention has as an object the preparation of new unsaturated compounds which can be polymerized and copolymerized with other polymerizable monomers to form products of unusual or improved properties. A further object is the synthesis of new unsaturated cyclic compounds having certain functional groups which are useful as chemical intermediates. Another object is the preparation of condensation polymer intermediates. Other objects of the invention will appear by a consideration of the following description of certain embodiments thereof.

These objects are accomplished by the present invention of an adduct of two moles of allene with an equimolar amount of an olefin having an activating group on at least one of the doubly bonded carbons.

The products resulting from the addition of two moles of the olefin to two moles of allene are Δ⁹,¹⁰-octalins having an even number, from 2 to 4, of activating groups on annular carbons, which activating groups are characterized in that each is united to one annular carbon of the Δ⁹,¹⁰-octalin nucleus by a carbon which is in turn attached to another atom by a multiple bond, each activating group being on singly bonded carbon separated by one carbon from doubly bonded carbon and there being the same number of activating groups on each six-membered ring, each carbon adjacent to the doubly bonded carbons bearing two hydrogens. A preferred group of the compounds of this class is that in which any remaining valences of nuclear carbon are satisfied by hydrogen, hydrocarbon groups, or activating groups of the type defined above.

The process of this invention is carried out by heating, in the absence of a polymerization initiator, a mixture of allene and a substituted ethylene having an activating group attached to one of the doubly bonded carbons of the ethylenic linkage to a temperature of 150–250° C. The activating group in the substituted ethylene reactant is characterized in the same manner as the activating group in the products defined above. That is, it is a group attached to one of the olefinic carbons by a carbon atom that is in turn attached to another atom by a multiple bond.

The reaction is illustrated by the following equations for the reaction of allene with acrylonitrile:

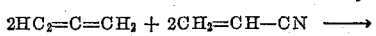

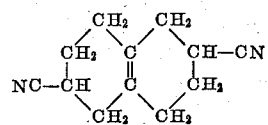

and/or

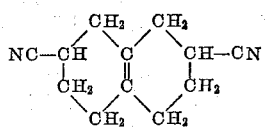

Best yields of the polysubstituted Δ⁹,¹⁰-octalins are obtained when equimolar amounts of the reactants, or a slight excess of allene, are employed.

Preferably the reaction is carried out at a temperature of 175° to 225° C., and still more preferably above 200° C. and in the presence of an addition polymerization inhibitor. The broad temperature operating range is generally between about 150° to 250° C.

The pressure under which this reaction is carried out is not critical. Good results are obtained when the reactants are heated in a closed container under the autogenous pressure developed by the reactants under the operating conditions.

The reaction vessel can be constructed of any material which is inert to the reactants and is capable of withstanding the operating pressures. Reaction vessels made of glass, stainless steel and glass-lined steel are quite satisfactory.

The reaction time can be varied widely, times ranging from 2 to 24 hours or more at 150° C to 250° C. are operable. Very good results are obtained in reaction periods ranging from 4 to 16 hours.

Reactants which are commercially available in the grades used for polymerization are satisfactory for use in the process of this invention. However, best results are obtained when the allene is relatively pure.

The process and products of this invention are illustrated in further detail in the following examples, in which the proportions of ingredients are expressed in parts by weight unless otherwise noted.

EXAMPLE I

Preparation of 3-Methylenecyclobutanecarbonitrile and 2,6(or 7)-Dicyano-Δ⁹,¹⁰-Octalin

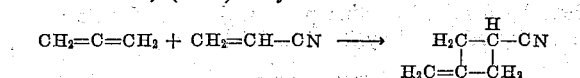

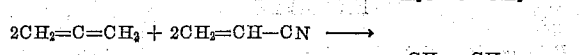

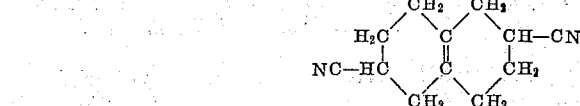

and/or

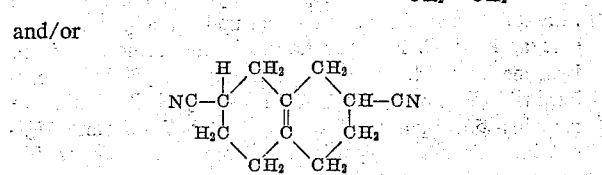

A mixture of 53 parts of acrylonitrile, 20 parts of allene and 1 part of hydroquinone is heated in a stainless steel reaction vessel at autogenous pressure for 16 hours at 200° C. The reaction product is isolated by cooling and bleeding off the unreacted gaseous allene and distilling the liquid residue. There is obtained 20.9 parts (corresponding to a 45.5% yield based on the allene charged) of 3-methylenecyclobutanecarbonitrile boiling at 59–62° C./17.5 mm. There is obtained as a residue from the distillation of the 3-methylenecyclobutanecarbonitrile 11.1 parts of crude 2,6(or 7)-dicyano-$\Delta^{9,10}$-octalin. After sublimation and crystallization from a mixture of 30 parts (by volume) of ethyl acetate and 25 parts of cyclohexane, there is obtained 5.4 parts of product melting at 143.5–144.5° C.

Analysis.—Calcd. for $C_{12}H_{14}N_2$: C, 77.3%; H, 7.6%; N, 15.1%; Mol. Wt. 186.2; Quant. Hydg. (one C=C and two C≡N), 0.0539 g. hydrogen/g. sample. Found: C, 76.35%; H, 7.51%; N, 15.04%; Mol. Wt. 175, 175; Quant. Hydg., 0.0499, 0.0578 g. hydrogen/g. sample.

The infrared absorption spectrum of this purified product shows a strong nitrile band at 4.45 microns. The absence of the carbon-carbon double bond absorption is indicative of a symmetrical structure.

Saponification of 10 parts of the purified 2,6(or 7)-dicyano-$\Delta^{9,10}$-octalin with sodium hydroxide in an ethanol-water mixture, followed by acidification, yields 13.7 parts of isomeric acids. Fractional recrystallization of the crude acids from mixtures of dimethylformamide and water yields two acids: Acid I, M.P. more than 300° C. (softens at 248–278° C.), Acid II, M.P. 248–250° C. (softens at 211° C.).

Analysis.—Calcd. for $C_{12}H_{16}O_4$: C, 64.27%; H, 7.19%; N.E., 112.2. Found: Acid I C, 64.09%, H, 7.16%, N.E., 118.1; Acid II C, 64.32%, H, 7.22%, N.E., 114.7.

The methyl esters of these isomeric acids are prepared by heating 7.72 parts of the mixture of acids obtained above, 200 parts of anhydrous methanol, and 1 part of p-toluenesulfonic acid under reflux for about 12 hours. The crude methyl esters amounting to 7.2 parts, corresponding to a yield of 83.2%, are isolated from the reaction mixture as a pale yellow viscous oil.

A heat-resistant glass reaction tube six inches long and one inch in diameter is packed with an intimate mixture of 2 parts of 10% palladium-on-charcoal and 8 parts of six-mesh charcoal chips, and the tube is electrically heated. The methyl esters prepared as described in the preceding paragraph (6.46 parts) and a slow stream of dry carbon dioxide are passed downward through the tube heated at 350°–400° C. during a period of one hour. The off gases are passed through aqueous sodium hydroxide solution to absorb the carbon dioxide, and the hydrogen evolved is measured with a wet-test meter, 2.2 liters at standard temperature and pressure being obtained. The solid product, amounting to 1.55 parts, is identified as naphthalene by a mixed melting point with an authentic specimen, by odor and by its ultraviolet absorption spectrum.

EXAMPLE II

*Preparation of 3-Methylenecyclobutanecarbonitrile and 2,6(or 7)-Dicyano-$\Delta^{9,10}$-Octalin*

A mixture of 53 parts of acrylonitrile, 40 parts of allene, 88 parts of benzene, and 1 part of hydroquinone is heated in a stainless steel reaction vessel under autogenous pressure at 225° C. for four hours. After removal of the benzene and 14.1 parts of 3-methylenecyclobutanecarbonitrile (B.P. 68–69.5° C./29 mm.) by distillation, there remains 55.1 parts of crude 2,6(or 7)-dicyano-$\Delta^{9,10}$-octalin. After recrystallization from a mixture of 100 parts (by volume) of ethyl acetate and 135 parts of cyclohexane, this product melts at 139–140° C.

EXAMPLE III

*Preparation of 1-Methyl-3-Methylenecyclobutanecarbonitrile and 2,6(or 7)-Dicyano-2,6(or 7)-Dimethyl-$\Delta^{9,10}$-Octalin*

A mixture of 201 parts of methacrylonitrile, 20 parts of allene and 2 parts of hydroquinone is heated at 225° C. for 8 hours as described in Example I. After working up the reaction mixture as described in that example there is obtained 31.7 parts of 1-methyl-3-methylenecyclobutanecarbonitrile, boiling at 58–58.5° C./21 mm., $n_D^{25}$, 1.4453.

Analysis.—Calcd. for $C_7H_9N$: C, 78.46%; H, 8.47%; N, 13.07%; Quant. Hydrog., 0.051 g. $H_2$/g. sample; Mol. Wt., 107.2. Found: C, 78.48%; H, 8.54%; N, 12.51%; Quant. Hydrog., 0.059 g. $H_2$/g. sample; Mol. Wt. 95, 0.060 g. $H_2$/g. sample; Mol. Wt. 97.

The infrared spectrum shows terminal methylene absorption at 5.93μ and 11.25μ, nitrile absorption at 4.48μ and methyl absorption at 7.25μ.

The residue from the distillation of 1-methyl-3-methylenecyclobutanecarbonitrile contains 2,6(or 7) - dicyano-2,6 (or 7)-dimethyl-$\Delta^{9,10}$-octalin.

By substituting for the acrylonitrile and methacrylonitrile in Examples I, II and III equivalent amounts of α-ethylacrylonitrile and maleic dinitrile, there can be obtained 1-ethyl-3-methylenecyclobutanecarbonitrile and 2,6 (or 7)-dicyano-2,6(or 7)-diethyl-$\Delta^{9,10}$-octalin, and 3-methylenecyclobutane - 1,2 - dicarbonitrile and 2,3,6,7-tetracyano-$\Delta^{9,10}$-octalin, respectively.

EXAMPLE IV

*Preparation of Methyl 3-Methylenecyclobutane-carboxylate and Dimethyl $\Delta^{9,10}$-Octalin-2,6(or 7)-Dicarboxylate*

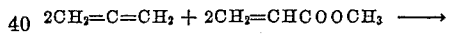

and/or

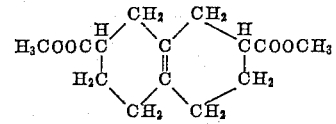

A mixture of 86.1 parts of methyl acrylate, 40 parts of allene, 88 parts of benzene and 2 parts of hydroquinone is heated under autogenous pressure at 215° C. for four hours. The reaction mixture is subjected to fractional distillation and there are obtained, after removal of benzene, 13.4 parts of crude methyl 3-methylenecyclobutanecarboxylate and 34.7 parts of dimethyl $\Delta^{9,10}$-octalin-2,6(or 7)-dicarboxylate boiling at 149–151° C./0.55–0.60 mm., and having a refractive index, $n_D^{25}$, of 1.4990–1.4970.

Analysis.—Calcd. for $C_{14}H_{20}O_4$: C, 66.64%; H, 7.99%; Mol. wt., 252. Found: C, 66.54%, 66.53%; H, 7.94%, 8.04%; Mol. wt., 222, 226.

By replacing the methyl acrylate of example IV with equivalent quantities of n-butyl methacrylate and ethyl acrylate, and following the procedures of this example, there can be obtained di-n-butyl 2,6(or 7)-dimethyl-$\Delta^{9,10}$-octalin-2,6(or 7)-dicarboxylate and diethyl $\Delta^{9,10}$-octalin-2,6(or 7)-dicarboxylate, respectively.

EXAMPLE V

*Preparation of Diethyl 3-Methylenecyclobutane-1,2-Dicarboxylate and Tetraethyl Δ9,10-Octalin 2,3,6,7-Tetracarboxylate*

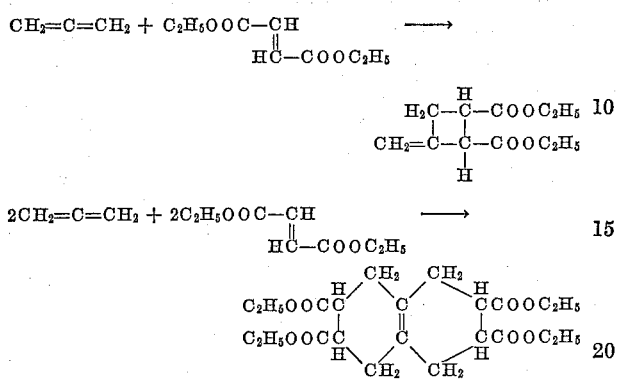

A mixture of 86.1 parts of diethyl fumarate, 10 parts of allene and 1 part of hydroquinone is heated under autogenous pressure at 200° C. for 13 hours in a reaction vessel of the type used in the preceding examples. Distillation of the reaction product yields 7.4 parts of diethyl 3-methylenecyclobutane - 1,2 - dicarboxylate boiling at 76–77° C./0.45 mm. and having a refractive index, $n_D^{25}$, of 1.4497–1.4484.

*Analysis.*—Calcd. for $C_{11}H_{16}O_4$: C, 62.5%; H, 7.60%; Mol. Wt., 212.2; Sap. Equiv., 106.1; Unsaturation, 0.0095 g. $H_2$/g. sample. Found: C, 62.65%; H, 7.87%; Mol. Wt., 205, 205; Sap. Equiv., 109. Unsaturation, 0.0111 g. $H_2$/g. sample, 0.0112 g. $H_2$/g. sample.

The residue from the above distillation of diethyl 3-methylenecyclobutane-1,2-dicarboxylate is a solid amounting to 11.6 parts. On recrystallization from methanol, white needles of tetraethyl Δ9,10-octalin-2,3,6,7-tetracarboxylate, melting at 128–135° C., are obtained.

*Analysis.*—Calcd. for $C_{22}H_{32}O_8$: C, 62.25%; H, 7.60%; Mol. wt., 424; Sap. Equiv., 106.1. Found: C, 62.34%; H, 7.63%; Mol. wt., 400, 405; Sap. Equiv., 106.

EXAMPLE VI

*Preparation of Tetraethyl Δ9,10-Octalin-2,3,6,7-Tetracarboxylate*

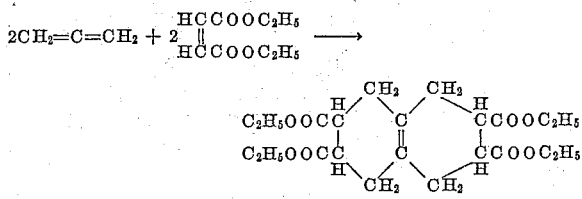

A mixture of 172 parts of ethyl maleate, 20 parts of allene, and 1 part of hydroquinone is heated at 225° C. for four hours in a stainless steel reaction vessel under the autogenous pressure developed. The reaction mixture is subjected to distillation and after removing a volatile fraction there is obtained a white solid residue amounting to 6.3 parts. After recrystallization from ethanol, the solid residue gives white needles of tetraethyl Δ9,10-octalin-2,3,6,7-tetracarboxylate, melting at 140.5–142.5° C.

*Analysis.*—Calcd. for $C_{22}H_{32}O_8$: C, 62.25%; H, 7.60%; Mol. wt., 424; Sap. Equiv., 106.1. Found: C, 62.71%; H, 7.66%; Mol. wt., 379, 387; Sap. Equiv., 104.

The tetraethyl Δ9,10-octalin-2,3,6,7-tetracarboxylate of this example is isomeric with that obtained from allene and diethyl fumarate, as described in Example V.

EXAMPLE VII

*Preparation of 2,6(or 7)-Dicarboethoxy-2,6(or 7)-Dicarboethoxymethyl-Δ9,10-Octalin*

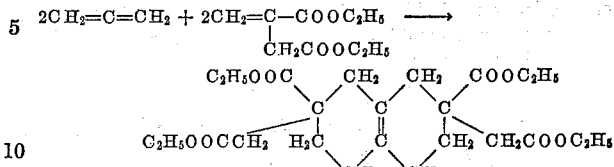

and/or

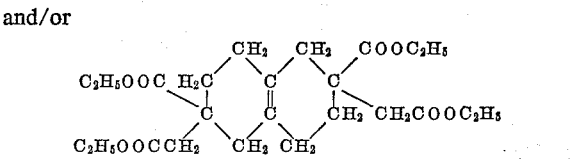

A mixture of 250 parts of diethyl itaconate, 20 parts of allene and 2 parts of hydroquinone is heated under autogenous pressure in a stainless steel reaction vessel at 225° C. for eight hours. The reaction mixture is subjected to fractional distillation to remove low boiling products, and the residue is then subjected to molecular distillation. There is obtained a fraction, 41 parts, boiling at 115–120° C./1 micron, and having a refractive index, $n_D^{25}$, of 1.4689–1.4685. This is 2,6(or 7)-dicarboethoxy-2,6(or 7)-dicarboethoxymethyl-Δ9,10-octalin.

*Analysis.*—Calcd. for $C_{24}H_{18}O_4$: C, 63.7%; H, 8.02%; Mol. wt., 252; Sap. Equiv., 113.2. Found: C, 60.54%; H, 7.91%; Mol. wt., 390, Sap. Equiv., 109.6, 110.3.

When the diethyl fumarate, diethyl maleate and the diethyl itaconate of Examples V–VII are replaced by equivalent quantities of diethyl methylenemalonate, there can be obtained diethyl 3-methylenecyclobutane-1,1-dicarboxylate and tetraethyl Δ9,10-octalin-2,2,6,6(or 7,7)-tetracarboxylate. The free carboxylic acids corresponding to these esters can be obtained by saponification of the esters with aqueous sodium hydroxide, followed by acidification with an inorganic acid.

EXAMPLE VIII

*Preparation of 3-Methylenecyclobutane-1,2-Dicarboxylic Anhydride and Δ9,10-Octalin-2,3,6,7-Tetracarboxylic Anhydride*

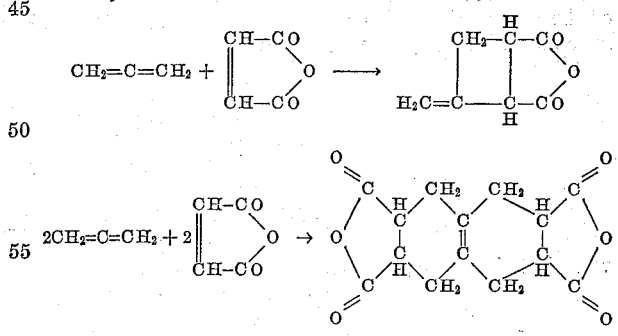

A mixture of 98.1 parts of maleic anhydride, 20.0 parts of allene, 176 parts of benzene and 0.5 part of hydroquinone is heated in a stainless steel vessel at 225° C. for 8 hours at autogeneous pressure. The reaction mixture is filtered to separate 26.2 parts of yellow solid from the liquid portion of the mixture. The unreacted benzene and maleic anhydride are removed from the filtrate by distillation. Distillation of the residue gives 21.3 parts of 3-methylenecyclobutane-1,2-dicarboxylic anhydride that boils at 151–157° C./22 mm.

*Analysis.*—Calcd. for $C_7H_6O_3$: C, 60.87%; H, 4.38%; Mol. wt., 138.1; Sap. Equiv., 69.06; Quant. Hydrog., 0.0145 g. $H_2$/g. sample. Found: C, 60.69%, 61.19%, 60.18%; H, 4.88%, 4.70%, 4.72%; Mol. wt. 141, 157; Sap. Equiv., 68.4, 68.3; Quant. Hydrog., 0.0186 g. $H_2$/g. sample.

The infrared spectrum shows absorption at 5.4μ and 5.6μ for the anhydride group and 5.95μ and 11.0μ for the terminal methylene group.

The yellow solid filtered out of the original reaction mixture melts at 235–239° C. after sublimation. Recrystallization of this product from ethyl acetate yields small white needles of $\Delta^{9,10}$-octalin-2,3,6,7-tetracarboxylic anhydride, melting at 239–240° C.

EXAMPLE IX

*Preparation of Dimethyl 3,7(or 6)-Dimethyl-$\Delta^{9,10}$-Octalin-2,6(or 7)-Dicarboxylate*

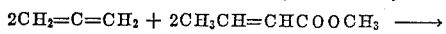

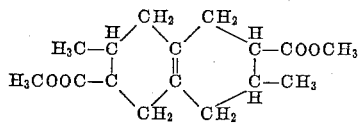

and/or

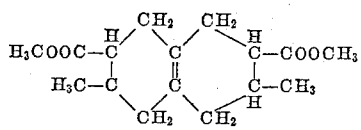

A mixture of 225 parts of methyl crotonate, 30 parts of allene and 1 part of hydroquinone is heated for 8 hours at 200° C. under autogenous pressure. On distillation of the reaction mixture, after removal of volatile material, there is obtained 35.2 parts of dimethyl 3,7(or 6) - dimethyl - $\Delta^{9,10}$ - octalin - 2,6(or 7) - dicarboxylate. On recrystallization from a mixture of ethanol and water, this product is a white, waxy solid melting at 85–89.5° C.

*Analysis.*—Calcd. for $C_{16}H_{24}O_4$: C, 68.54%; H, 8.73%; Mol. wt., 280.4. Found: C, 68.33%; H, 8.73%; Mol. wt., 250.

The products of this invention comprise any $\Delta^{9,10}$-octalin having attached to the carbons in the 2 and 3-positions of the octalin ring at least one activating group, which activating group is characterized in that it is united to the annular carbon of the octalin ring by a carbon which is, in turn, attached to another atom by a multiple bond, having attached to the carbons in the 6 and 7-positions of the octalin ring the same number and kind of activating groups that are attached to the 2 and 3 carbons, the annular carbons in the 1, 4, 5 and 8 positions of the octalin ring being unsubstituted. These products have the following general formula:

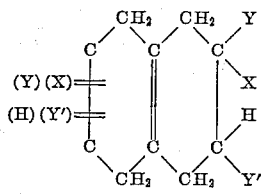

wherein X is COOH, COOR,

CN, CONH$_2$, or phenyl; Y and Y' are X, H,

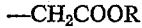

phenyl or alkyl of up to 12 carbons, at least one of Y and Y' being hydrogen; and R is lower alkyl. The X and Y' on adjacent carbons can be divalent activating groups characterized in that they are attached to the annular carbons of the octalin ring by two carbons each attached in turn by multiple bonds to another atom, for example each pair of X and Y' may represent

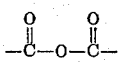

In addition to the specific $\Delta^{9,10}$-octalins illustrated by the examples, the following $\Delta^{9,10}$-octalins can be prepared by reaction of the substituted ethylenes listed in the first column of the table with allene under the conditions described above.

TABLE I

| Substituted Ethylenes | $\Delta^{9,10}$-Octalins |
|---|---|
| Styrene | 2,6(or 7)-diphenyl-$\Delta^{9,10}$-octalin. |
| 1,1-Diphenylethylene | 2,2,6,6(or 7,7)-tetraphenyl-$\Delta^{9,10}$-octalin. |
| Acrylamide | $\Delta^{9,10}$-octalin-2,6(or 7)-dicarboxamide. |
| Maleamide | $\Delta^{9,10}$-octalin-2,3,6,7-tetracarboxamide. |
| Methyl vinyl ketone | 2,6(or 7)-diacetyl-$\Delta^{9,10}$-octalin. |
| Methacrylic acid | 2,6(or 7)-dimethyl-$\Delta^{9,10}$-octalin-2,6(or 7)-dicarboxylic acid. |

In place of hydroquinone and phenothiazine, other conventional addition polymerization inhibitors which do not react with any of the reactants can be used in the process of this invention. Examples of other inhibitors which are operable include copper resinate, the naphthylamines and β-naphthol.

The polysubstituted $\Delta^{9,10}$-octalins of this invention are useful for many purposes. For example, they are useful for reacting with complementary bifunctional reactants to form condensation polymers. These condensation polymers are useful as adhesives, coating compositions, films, and the like. The polysubstituted $\Delta^{9,10}$-octalins having carboxyl or carbalkoxyalkyl groups are useful for the formation of such condensation polymers as polyesters, polyamides and polyimides.

The following are illustrative of the use of the $\Delta^{9,10}$-octalins of this invention in reactions with bifunctional reactants to form condensation polymers that are useful for various purposes.

An alkyd resin useful in coating compositions is prepared as follows: A mixture of approximately 1 part by volume of the $\Delta^{9,10}$-octalin-2,3,6,7-tetracarboxylic dianhydride of Examples VIII with approximately 2 parts of glycerol heated to just below the boiling point of the mixture gives a clear viscous syrup which is water-soluble. This clear syrup is flowed while still warm onto clean aluminum plates which are then baked in an oven at 200° C. for a few minutes to evaporate excess glycerol from the mixture. About 40 minutes baking at this temperature is sufficient to remove the glycerol from a film of approximately 0.5 mil thickness. The coated plate is then immersed in cold water. The polyester coating on the aluminum plate is indented, but not cut through, by a 9H pencil and yet is flexible enough to permit bending the coated plate sharply enough to crack the aluminum without cracking the alkyd resin coating.

A polyester is prepared by heating a mixture of 10.1 parts by weight (0.04 mole) of the dimethyl $\Delta^{9,10}$-octalin-2,6(or 7)-dicarboxylate of Example IV, 6.2 parts (0.10 mole) of ethylene glycol and 0.05 part of zinc acetate dihydrate is heated under nitrogen at atmospheric pressure for 5.5 hours at 220–225° C. and for 5 hours at 225° C.±5° C. under reduced pressure (final pressure is 0.3 mm. of mercury). During this heating the volatile by-products are removed from the reaction system by distillation. After cooling to room temperature, the reaction mixture is a pale yellow glassy polymer which is soluble in chloroform. The chloroform solution is spread on glass plates and allowed to dry. The clear film of polyethylene $\Delta^{9,10}$-octalin-2,6(or 7)-dicarboxylate adheres so strongly to the glass plate that it cannot be removed without deforming it. A film of the polyethylene $\Delta^{9,10}$-octalin-2,6(or 7)-dicarboxylate formed on a sheet of polytetrafluoroethylene by evaporation of the solvent from a chloroform solution followed by drying is also very adherent to the polytetrafluoroethylene.

A polyamide that is capable of being melt-spun into fibers is prepared as follows: A mixture of 5.32 parts (0.0458 mole) of hexamethylenediamine and 12.68 parts (0.0458 mole) of the dimethyl $\Delta^{9,10}$-octalin-2,6(or 7)-dicarboxylate of Example IV is heated under nitrogen in a sealed tube at 200° C. for 3 hours and 25 minutes. The tube is then opened and the reaction mixture is heated under a stream of nitrogen at a temperature ranging from 200° C. to 330° C. for a period of 2 hours. The mixture is then heated at 325 °C. for 3 hours under a vacuum decreasing from 100 mm. down to 0.4 mm. of mercury. The resulting polyamide is pale orange in color and fibers can be drawn from the molten polymer.

The $\Delta^{9,10}$-octalins are also useful as chemical intermediates. For example, they can be hydrogenated to the corresponding saturated ring compounds by use of nickel alloy skeleton catalysts, and the polycyano compounds can be hydrogenated in the presence of carbon-supported palladium catalysts to the corresponding polyamines. Ester groups on the $\Delta^{9,10}$-octalins can be hydrogenated to hydroxyl groups by use of copper chromite catalysts.

The following is illustrative of the use of the $\Delta^{9,10}$-octalins of this invention as chemical intermediates for the production of other useful products.

A mixture of 2.7 parts (0.1 mole) of the $\Delta^{9,10}$-octalin-2,3,6,7-tetracarboxylic dianhydride of Example VIII, 120 parts (0.9 mole) of 2-ethyl-1-hexanol and approximately 2 parts of concentrated sulfuric acid is heated under reflux in an apparatus where the water formed as a by-product is removed continuously. Reaction is continued until the water is completely removed, about 2 hours being required. The reaction mixture is washed with 5% aqueous sodium bicarbonate solution and excess alcohol is removed by distillation leaving 67.6 parts (89% of theory) of clear brown tetra(2-ethyl-hexyl) $\Delta^{9,10}$-octalin-2,3,6,7-tetracarboxylate.

*Analysis.*—Calcd. for $C_{46}H_{80}O_8$: C, 72.59%; H, 10.60%. Found: C, 71.96%; H, 10.77%.

A composition of a commercial copolymer of vinyl chloride and vinyl acetate ("Vinylite" VYNW) containing 30% tetra(2-ethyl-hexyl) $\Delta^{9,10}$-octalin-2,3,6,7-tetracarboxylate as plasticizer was applied to a glass plate and allowed to dry. A clear, tough, pliable film was stripped from the plate. In contrast thereto, a film of the same copolymer without the plasticizer was brittle and could not be stripped from the glass plate.

As many apparently widely different embodiments of this invention may be made without departing from the spirit and scope thereof, it is to be understood that this invention is not limited to the specific embodiments thereof except as defined in the appended claims.

What is claimed is:

1. $\Delta^{9,10}$-octalins of the formula:

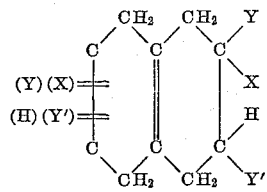

wherein X is selected from the group consisting of —COOH, COOR,

—CN, —CONH$_2$ and phenyl; Y and Y' are selected from the group consisting of X, hydrogen —CH$_2$COOR and alkyl of up to 12 carbons, at least one of Y and Y' being hydrogen; R is lower alkyl; and X and Y' on adjacent carbons jointly represent

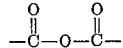

2. $\Delta^{9,10}$-octalin-2,3,6,7-tetracarboxylic dianhydride.

3. A compound of the formula

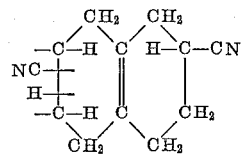

4. A compound of the formula

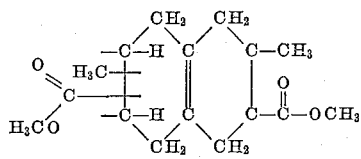

5. A compound of the formula

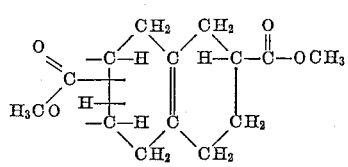

6. Tetraethyl $\Delta^{9,10}$-octalin-2,3,6,7-tetracarboxylate.

References Cited in the file of this patent

Alder: Berichte, vol. 87 (1954), pp. 1567–71.
Bailey et al.: J. Amer. Chem. Soc., vol. 75, 4780–2 (1953); vol. 76, 2251–4 (1954); vol. 78, 670–2 and 2806–8 (1956).
Blomquist et al.: J. Amer. Chem. Soc., vol. 78, pp. 109–12 (1956).
Frejka et al.: Chemical Abstracts, vol. 47 (1953), col. 8025h (Abstract of Chem. Listy, 46 (1952), pp. 684–5).
Smith et al.: J. Econ. Emtomol., vol. 42 (1949), pp. 439–44.